Sept. 27, 1927.

J. LEDWINKA 1,643,742

VEHICLE BODY

Filed Dec. 7, 1921

*Witness*
Walter N. Frout

INVENTOR.
JOSEPH LEDWINKA.
BY
C. B. Desjardins
ATTORNEY.

Sept. 27, 1927.  J. LEDWINKA  1,643,742
VEHICLE BODY
Filed Dec. 7, 1921   4 Sheets-Sheet 2
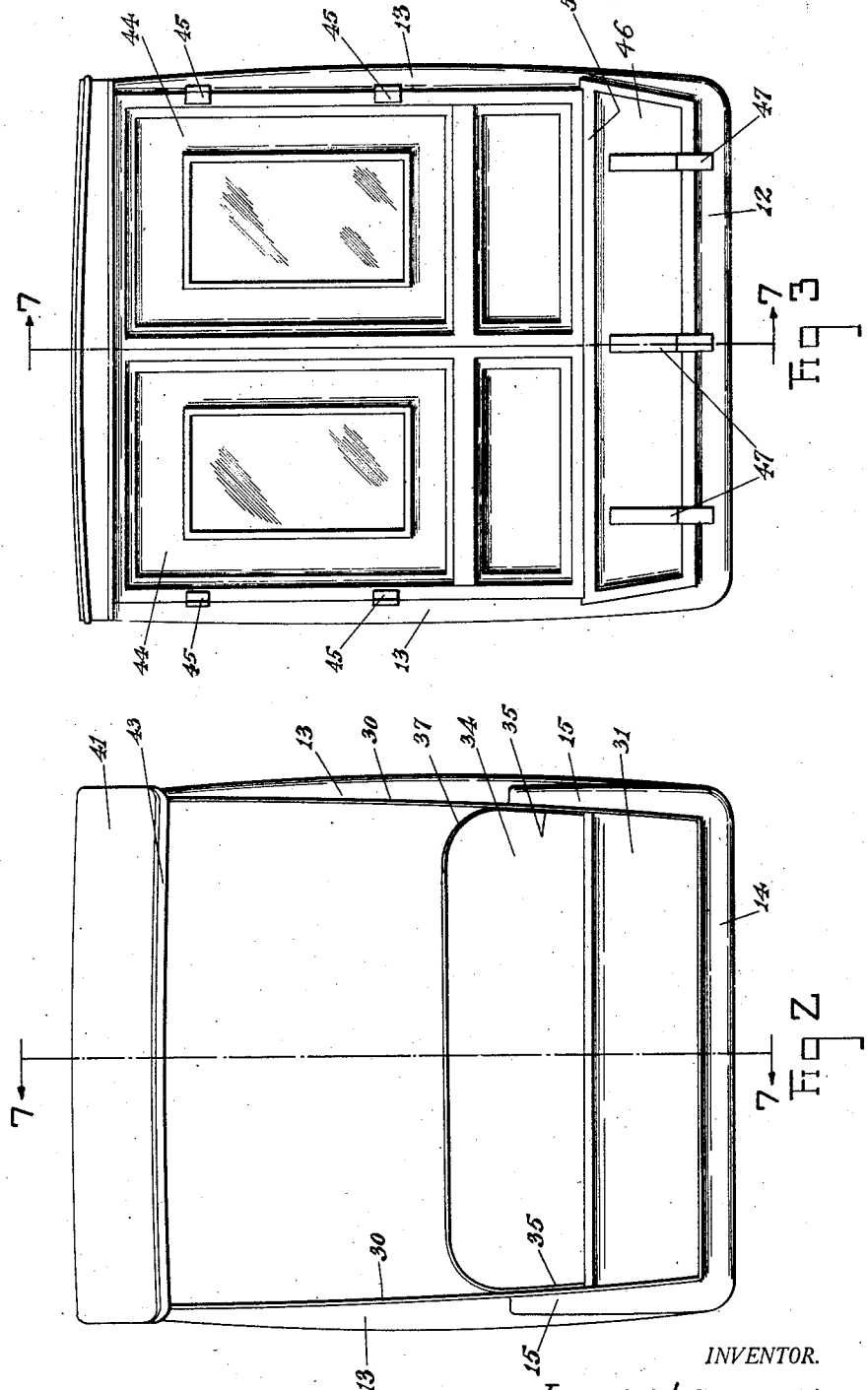
INVENTOR.
JOSEPH LEDWINKA
BY
ATTORNEY.

Sept. 27, 1927.　　　　J. LEDWINKA　　　　1,643,742
VEHICLE BODY
Filed Dec. 7, 1921　　　　4 Sheets-Sheet 3
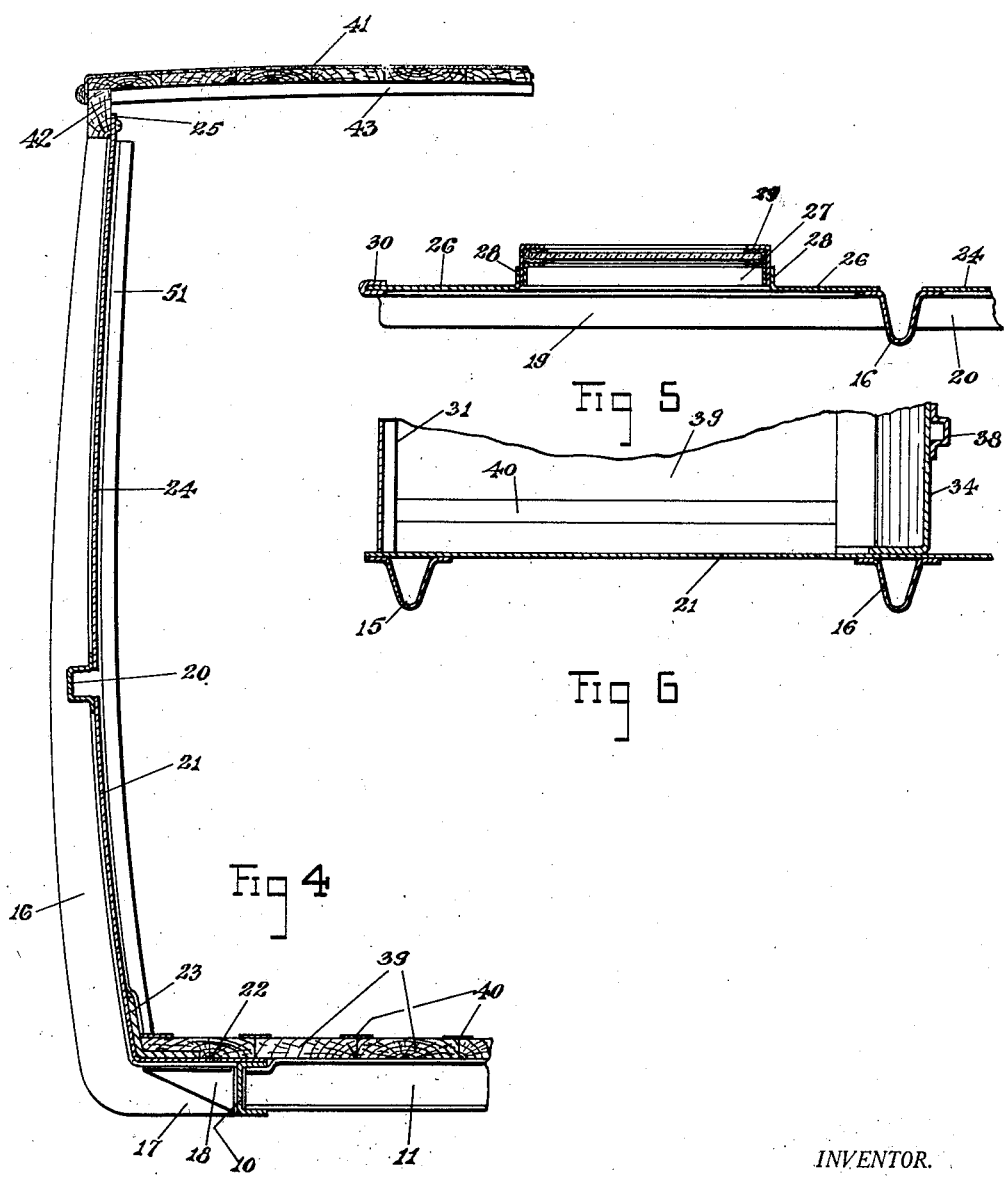
INVENTOR.
JOSEPH LEDWINKA.
BY
ATTORNEY.

Sept. 27, 1927.  J. LEDWINKA  1,643,742
VEHICLE BODY
Filed Dec. 7, 1921  4 Sheets-Sheet 4

INVENTOR.
JOSEPH LEDWINKA
BY
ATTORNEY.

Witness

Patented Sept. 27, 1927.

1,643,742

UNITED STATES PATENT OFFICE.

JOSEPH LEDWINKA, OF PHILADELPHIA, PENNSYLVANIA, ASSIGNOR TO EDWARD G. BUDD MANUFACTURING COMPANY, OF PHILADELPHIA, PENNSYLVANIA, A CORPORATION OF PENNSYLVANIA.

VEHICLE BODY.

Application filed December 7, 1921. Serial No. 520,678.

This invention relates to improvements in vehicle bodies, and more particularly to vehicle bodies of the delivery or express type, adapted to be mounted on the chassis of an automobile.

One of the objects of the invention is to provide a vehicle body of the delivery or express type which is simple in structure, light but strong and sturdy in construction, and capable of withstanding the severe usage to which such bodies are usually subjected in use, and which is economical to manufacture.

A further object is to provide a body of the character referred to having a framework made up of sheet metal stampings, assembled and secured together, and to and upon which body side panels, flooring, roof, and end gates and doors, are applied and supported.

A further object of the invention is to provide a body of the type and character referred to in which a supporting framework is employed having vertically extending brace or supporting members to which are applied and secured the body side panels, said braces and panels having such formation as to prevent buckling of the side panels, thereby rendering the body practically noiseless in use.

A further object of the invention is to provide means which are simple and efficient to form a seat for the driver.

Further objects of the invention will appear more fully hereinafter.

The invention consists substantially in the construction, combination, location, and relative arrangement of parts, all as will be more fully hereinafter set forth, as shown in the accompanying drawings, and finally pointed out in the appended claims.

Referring to the drawings:—

Fig. 2 is a view in front elevation of the same.

Fig. 3 is a view in rear elevation of the same.

Fig. 4 is a broken view in vertical transverse section on the line 4, 4, Figs. 1 and 7, looking in the direction of the arrows.

Fig. 5 is a broken view in horizontal section on the line 5, 5, Figs. 1 and 7, looking in the direction of the arrows.

Fig. 6 is a view similar to Fig. 5, on the line 6, 6, Figs. 1 and 7, looking in the direction of the arrows.

The same part is designated by the same reference numerals wherever it occurs throughout the several views.

Automobile bodies of the delivery or express type are subjected to severe and rough usage in transportation, loading and unloading of merchandise, and the like, and therefore are required to be constructed with great strength in order to enable them to withstand such rough and severe usage. It has been a common practice in the construction of bodies of this class and type to employ heavy parts in order to secure the desired strength of structure, thereby greatly adding to the weight of the body, and to the cost of manufacture thereof. In the manufacture of such bodies where sheet metal body panels are employed, the objection is incurred of the body panels buckling, and producing drumming and annoying noises under the shocks and vibrations to which bodies in use are subjected. Moreover, where covered bodies are used, which is the prevailing practice at present, difficulty is experienced in properly supporting the roof structure. Again, it is the custom to provide vehicle bodies of this type and class with a seat for the driver, and also with end doors and gates for the rear end of the body. Where the driver's seat or the end doors and gates are carried by the side walls of the body, difficulty is encountered of causing the side walls of the body to warp out of shape under the weight of the driver, in the case of the driver's seat, and under the effects of slamming and other rough usage to which the doors of such bodies are subjected.

It is among the special purposes of my present invention to avoid the objections above noted, and others, in the manufacture of vehicle bodies of the type and character referred to, and in carrying out my invention I propose to employ a body framework containing longitudinally extending body side sills or base members which are connected together by cross members, and to which are secured vertically extending ribs, and I also propose to connect the vertically extending ribs by longitudinally extending side rails, and to employ such framework as a support for the driver's seat, and to receive the body side panels, and to support with the side panels the roof structure, and also to support the end doors and gate. In order to avoid the production of objectionable drumming noises when sheet metal body side panels are employed, I propose, in accordance with my invention, to longitudinally curve the vertically extending ribs to which the body side panels are applied and secured in corresponding vertical curvature, so as to produce on the exterior a more or less convexed surface.

Figure 1:
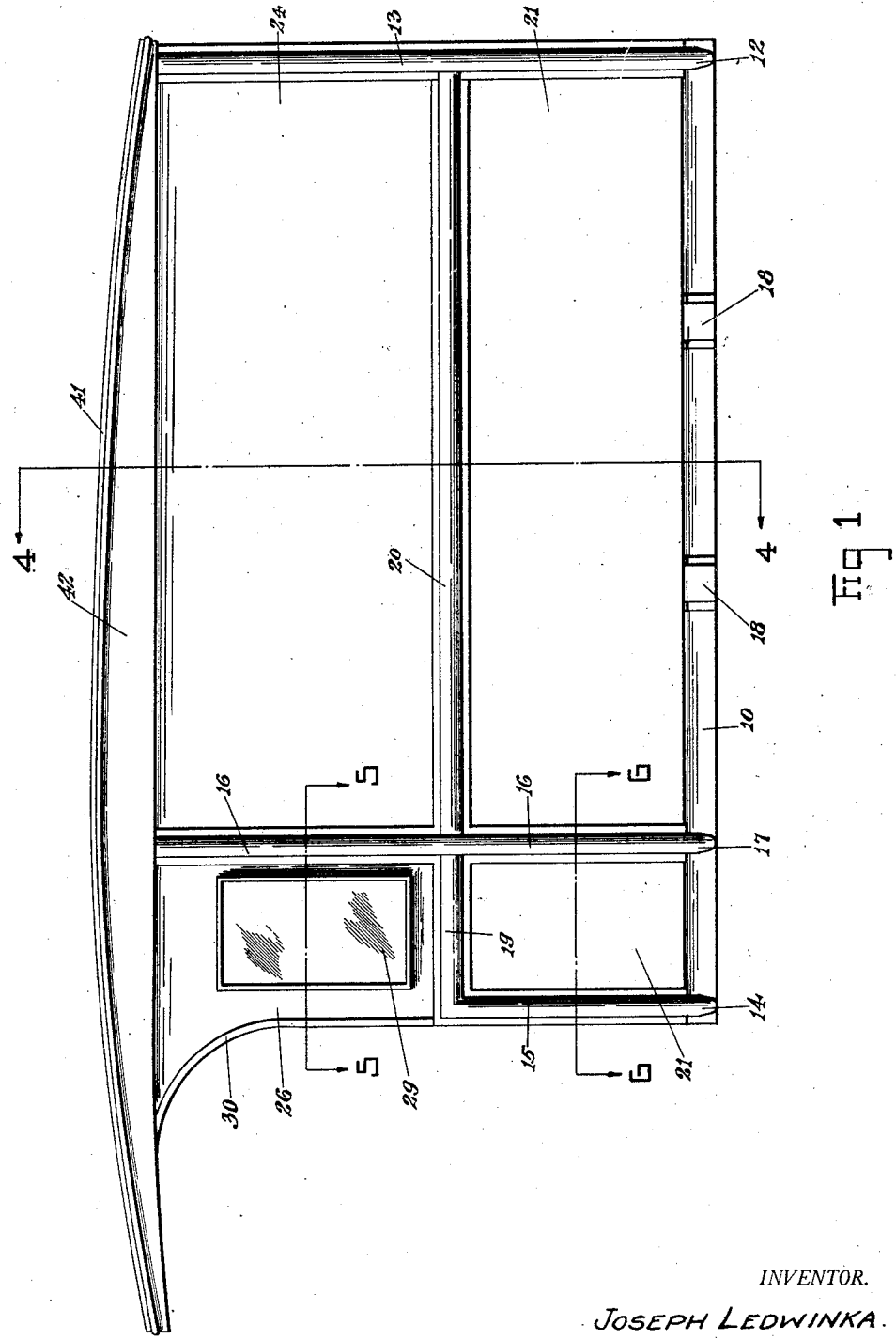
Fig. 1 is a view in side elevation of a body structure embodying the principles of my invention.

In the accompanying drawings I have shown one illustrative form of embodiment of my invention comprising a body made up of side panels, flooring, roof, and rear end doors or gates, together with a driver's seat at the front end of the body, with a projecting roof portion extending forwardly of the seat. My invention, however, is not to be limited or restricted to the use of all of these features. The body side panels, roof, flooring, driver's seat, and doors are mounted upon a framework, which, in this instance, is made up of the longitudinally extending body side sills 10. These members may be of any desired shape or form. In the particular form shown, I employ a framework consisting of longitudinally extending body side sills, cross connecting members, vertically extending ribs, and longitudinally extending rails connecting the ribs, these various parts being suitably assembled and connected together to form a supporting skeleton framework, to which the body side panels, roof, flooring, seat structure, and doors, may be applied. In the particular form shown the body side sills 10 are of channel shape in cross section, and connected together by the cross members 11, which, in the particular form shown, are also of channel shape in cross section, the ends of the connecting members 11 fitting within the channel of the sill members 10. The vertically disposed rib at the rear end of the body is shown in the form of a channel-shaped stamping of generally U-shape, the base portion 12 of which extends horizontally and transversely across the body, and to which the rear ends of the sills 10 are rigidly secured. The vertically extending end portions 13 of this rib are shown slightly curved longitudinally so as to present a slightly convexed exterior surface. These end portions 13 extend to the roof of the vehicle. At the forward end of the body a similar rib stamping of channel-shape in cross section is provided, having the intermediate body portion 14 arranged to extend horizontally and transversely across the body, and to which the forward ends of the base sills 10 are connected. The vertical end portions 15 of this rib do not extend to the roof but terminate in this instance at a point slightly above the driver's seat. Intermediate the front and rear U-shape rib above referred to I employ a pair of vertically extending rib members, one at each side of the body, each having the vertically extending portions 16, and at their lower ends the horizontally extending portions 17, which latter extend inwardly and are suitably secured to the adjacent body sill members 10. These ribs 16, or the vertical portions thereof, are likewise curved longitudinally so as to present a convexed exterior surface, and they likewise extend upwardly to the roof of the body. In practice I prefer to locate the vertical ribs 16 adjacent the driver's seat back at the front end of the body. The rib 13 at the rear end of the body is connected to the rib 16 at the driver's seat near the front end of the body by means of the side rails 20, while the ribs 16 are connected to the vertical portions 15 of the U-shaped rib at the extreme front end of the body by means of side rail portions, 19, the side rails 19 and 20 being disposed at the same height and in line with each other at the respective sides of the body. The framework above described, it will be seen, is composed of few parts, and these may be in the form of metal stampings, and hence capable of being produced rapidly and in quantities, and easily assembled and secured together. The side sills or base members 10 are not only connected together by the cross members 11, but also at their ends by the U-shaped ribs 12 and 14. This makes not only an exceedingly strong, rugged and durable framework, but also one which at the same time is light and composed of parts which may be manufactured quickly and economically and rapidly assembled. The various parts being of channel shape in cross section are preferably also provided with laterally extending edge flanges or lips, and in the case of the vertically extending ribs and the longitudinally extending side rails, the channels of said stampings are presented inwardly so that the edge flanges thereof afford efficient means to receive and have secured thereto the body panels. A plurality of brackets, 18, are also provided and extend laterally from the sills, 10, see Figs. 1 and 4.

The body panels may be formed in any desired size and applied and secured in any desired manner to the interior surfaces of the vertical ribs. In practice I prefer to employ upper and lower body panels, the lower side portions of the body being formed by the lower panels 21. Where a lower side body panel 21 is used, such panel is applied interiorly to and rigidly secured by welding or otherwise to the edge flanges of the ribs 13, 15 and 16, and the rails 19 and 20. In this instance a panel 21 is employed at each side of the body, and is secured at its upper edge to the lower flanges of the horizontal rails 19, 20, its front and rear edges being secured to the vertical flanges of the ribs 15 and 13 respectively, and at its lower edge the panel 21 is bent or flanged inwardly as at 22 to rest upon and to be secured to the horizontal portions 12, 14, and 17, of the vertical ribs, the brackets 18, and the body sills 10, as clearly shown in the drawings. If desired, the lower portions of the body panels 21 at the bend thereof, to form the flange 22, may be reinforced by angle strips 23, see Fig. 4, which extend longitudinally of the body. This feature, however, while desirable, is not essential. In the form of body shown, the upper side portions thereof are formed by panels 24. These may be formed of a single stamping and are secured at their lower edges by welding or otherwise to the upper flanges of the horizontal side rails 20, and at their front vertical edges to the rear flanges of the upper portions of the rib 16, while at their rear edges said upper body panels are secured to the forward flanges of the vertical rib portions 13. The upper edge portions of the body side panels 24 project slightly above the upper ends of the ribs 13 and 16, as indicated at 25, see Fig. 4.

As above described, the ribs 13 and 16 are curved or bent in the direction of their length so as to present a somewhat convexed outer surface, and correspondingly concaved inner surface from end to end. Consequently, when the sheet metal panels 21, 24, are applied and secured thereto, they assume a corresponding curve, giving the body as a whole, a slightly convexed appearance upon its exterior, that is, convexed in a vertical direction. This arrangement places the body panels in a more or less flexed condition, and hence, they are prevented from buckling, and noise or drumming due to vibrations set up therein in the use of the body are eliminated. This I regard as an important feature of my invention.

The body sides are completed by what I term quarter panels 26 at the forward upper portion of the body. The lower edges of these quarter panels are secured to the upper flanges of the side rails 19, while their rear vertical edges are secured to the forward flanges of the vertical ribs 16. In the form shown, the quarter panels 26 are provided with window openings 27 therethrough, the border edges of which are formed with laterally and inwardly extending flanges 28, which receive window frames 29.

Figure 7:
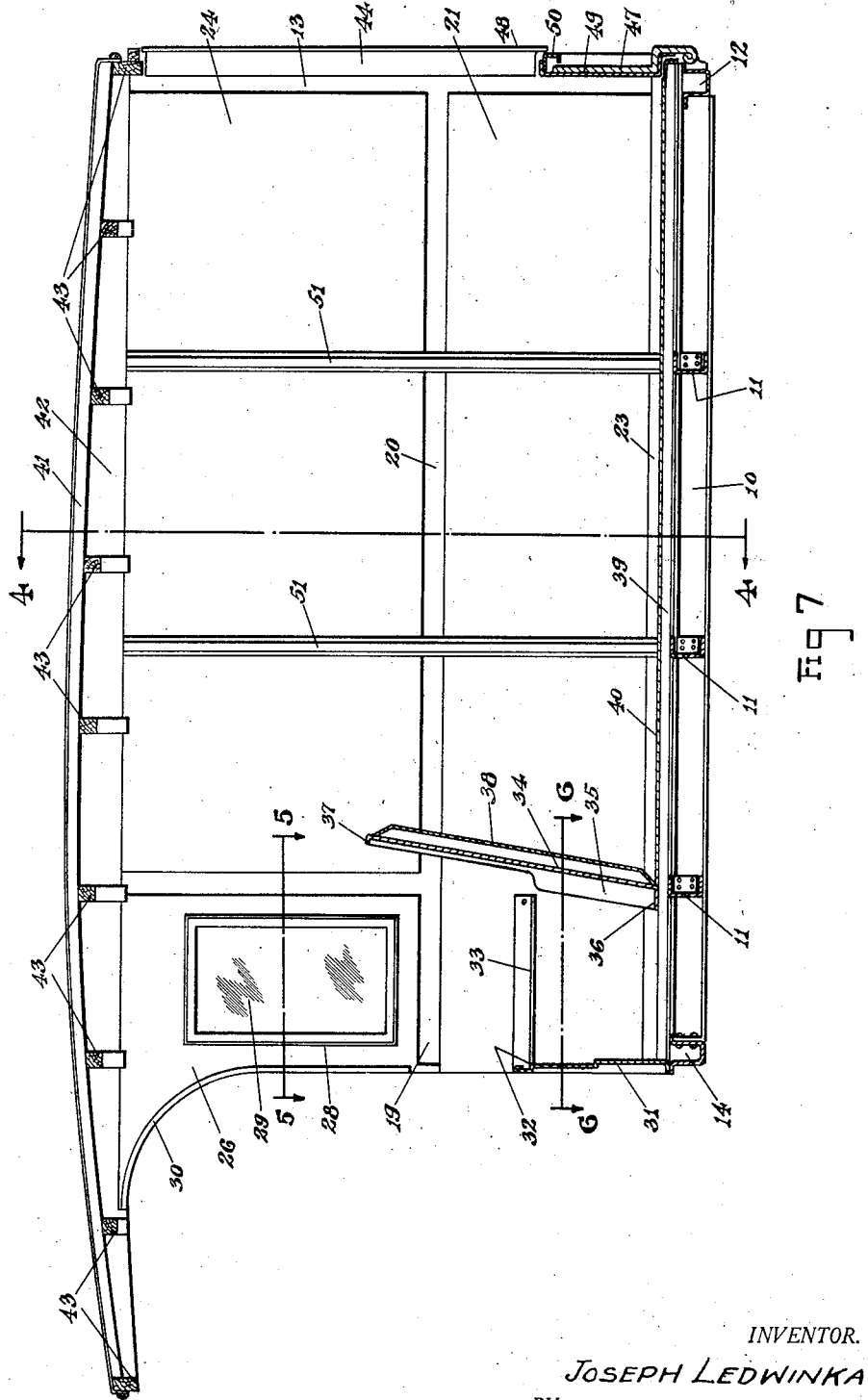
Fig. 7 is a view in vertical longitudinal section on the line 7, 7, Figs. 2 and 3, looking in the direction of the arrows.

If desired, the forward vertical edges of the quarter panels 26 are reinforced by binding strips 30 bent thereover, as shown in Fig. 5. A vertically disposed transversely extending panel 31 is positioned at the front end of the body with its vertical side edges secured to the vertical forward flanges of the front rib 15. This panel 31 constitutes a tie between the front ends of the frame, and also constitutes a heel board for the driver's seat. Near its upper edge the panel 31 is formed with a shoulder or ledge 32. Angle bars 33, horizontally disposed, are secured at their ends to the vertical ribs 15 and 16, see Fig. 7, and with the ledge or shoulder 32 constitute supports for the driver's seat. In this manner it will be observed that the weight of the seat and of the driver and the strains to which the seat is subjected in use, are taken by the framework of the body instead of the body side panels or side walls. A seat back may be provided for the driver's seat, and may be of any suitable construction and arrangement. A simple arrangement is shown, and which consists of a sheet metal panel 34 which extends transversely across the body adjacent the rear ends of said seat supports 33. This panel is provided with laterally extending flanges 35 at the respective ends thereof, and also with a laterally extending flange 36 at its lower edge. The end flanges 35 are secured to the flanges of the vertically extending ribs 16 and also to the flanges of the horizontal rail 20, while the base flange 36, in the arrangement shown, rests upon the flooring 39 of the body. At its upper edge the panel 34 is formed with a flange 37, which affords means for engaging and retaining a seat back cushion. This panel, 34, is reinforced by the ribs, 38, secured thereto.

The floor of the body may be formed in any suitable or convenient manner and of any desired material. In the arrangement shown, I employ floor boards 39, which extend longitudinally of the body and are supported upon the cross connections 11, the outer side members of the flooring being received upon the inturned flange 22 of the body side panels 21. If desired, the points between adjacent floor boards 39 may be covered by metal strips 40 as shown in Fig. 4.

Any desired roof structure may be employed in a vehicle body embodying my invention. I have shown a simple structure of roof which is light and which is efficiently supported. In the arrangement shown the roof 41 includes side members 42 and cross members 43. The side members 42 of the roof structure are carried by the upper ends of the ribs 16 and 13, while the upper projecting portions 25 of the side panels 24 are also secured to the roof side members 42. This affords a very simple, strong, light and efficient roof structure, and wherein the stresses due to its weight, and vibrations while in use, are in large measure transmitted to and taken by the frame structure of the body.

It is customary to provide vehicle bodies of the type and nature referred to with swinging doors at the rear end thereof. I have shown rear end doors 44, which, in accordance with my invention, are hinged as at 45 to the vertical portions 13 of the rear rib. The doors may be of any desired structure. In the form shown the doors 44 are provided with edge stop flanges 48. If desired, and in the arrangement shown, instead of the doors extending from the roof to the floor at the rear end of the body, they may terminate a short distance above the floor. Where the doors terminate above the line of the floor the remaining space is closed by an end gate 46, which, in the form shown, consists of a panel 49, carried by hinge straps 47, which are pivotally connected at their lower ends to the horizontal portion 12 of the rear body frame rib. If desired, and preferably, a reinforcing channel member 50 is secured to the upper edge of the lower door or gate 46, and which receives the lower edge flange 48 of the vertically hinged doors 44 when the doors and gate are closed. From this description it will be seen that both the horizontally swinging vertically hinged doors 44, and also the lower end gate 46 are supported directly upon the body framework, and hence the body side walls are relieved from the stresses and strains imposed by opening and closing the doors and gate.

If desired, and in order to still further brace the body side panels, I have shown vertically disposed reinforcing channel members 51 applied to the inner surfaces of the panels, and extending, at suitable intervals apart, from the floor line to the roof. These reinforcing channel members are curved in the direction of their length to conform to the curvature of the interior surface of the panels. These reinforcing channel members, however, while desirable, are not essential.

From the foregoing description it will be seen that I provide an exceedingly simple structure of delivery or express body, which can be manufactured at low cost, which is light, though strong, rugged and durable, and wherein metallic parts are employed throughout in the supporting framework, and wherein the side walls are composed of sheet metal stampings. All the parts are of simple, easily produced shapes, and are capable of being quickly, readily and easily assembled, and secured together. The roof structure is likewise light, though strong and durable, and easily assembled, mounted and secured in place.

It will be observed that the roof extends forwardly of and over the driver's seat, but by securing the roof to the upper edges of the body panels 24, 26, this forward extension of the roof is firmly and rigidly held and supported.

Many variations and changes in the details of construction and arrangement will readily occur to persons skilled in the art, and still fall within the spirit and scope of my invention. I do not desire therefore to be limited or restricted to the exact details shown and described. But having now set forth the objects and nature of my invention, and a structure embodying the principles thereof, what I claim as new and useful, and of my own invention, and desire to secure by Letters Patent is,—

1. A vehicle body of the class described comprising a plurality of metallic ribs having vertically extending portions, outwardly curved between their ends, and a sheet-metal panel rigidly secured under flexed stress to said ribs to form a side of the body.

2. A vehicle body of the class described comprising an under-frame, a plurality of vertically extending metallic bracing ribs rigidly secured to said under-frame, sheet metal side panels applied and rigidly secured to said ribs to form the sides of the body, the upper portions of said panels projecting beyond the upper ends of said ribs, and a roof structure including side members resting on the upper ends of said ribs and secured to the projecting portions of said panels.

3. A vehicle body of the class described comprising an under-frame, a plurality of vertically extending metallic bracing ribs rigidly secured to said under-frame, sheet metal panels applied and rigidly secured to said ribs to form the sides of the body, a seat-back panel provided with side flanges rigidly secured to certain of said ribs, angle bars secured to the sides of said body and forming seat supports, and a transversely extending sheet metal panel secured to the ribs at the forward end of said under-frame and having its upper portion in line with said angle bars.

4. A vehicle body of the class described comprising a framework, sheet-metal panels applied and rigidly secured to said framework to form the sides of the body, the upper portions of said panels being free of said framework, and a roof structure secured to the free portions of said panels.

5. A vehicle body of the class described comprising a frame structure including a rib having a vertically extending portion outwardly curved between the ends thereof, and a sheet metal panel rigidly secured under flexed stress to said frame structure to form a side of the body.

In testimony whereof, I affix my signature.

JOSEPH LEDWINKA.